US006544571B1

United States Patent
Porter

(10) Patent No.: US 6,544,571 B1
(45) Date of Patent: Apr. 8, 2003

(54) METHOD OF ENHANCING THE FLAVOR OF SEAFOOD

(76) Inventor: Scott Alan Porter, 247 Chauff St., Houma, LA (US) 70360

(*) Notice: Subject to any disclaimer, the term of this patent is extended or adjusted under 35 U.S.C. 154(b) by 0 days.

(21) Appl. No.: 09/590,709

(22) Filed: Jun. 8, 2000

Related U.S. Application Data

(60) Provisional application No. 60/138,334, filed on Jun. 9, 1999.

(51) Int. Cl.⁷ .................................................. A23B 4/00
(52) U.S. Cl. ............................ 426/506; 62/64; 426/524
(58) Field of Search ................................ 426/506, 524; 62/64

(56) References Cited

U.S. PATENT DOCUMENTS 6,143,343 A  * 11/2000  Wilson ..................... 426/506

* cited by examiner

Primary Examiner—George C. Yeung
(74) Attorney, Agent, or Firm—Garvey, Smith, Nehrbass & Doody, L.L.C.; Seth M. Nehrbass

(57) ABSTRACT

A method of wet-storing and purging fish and shellfish makes them fit for safe raw consumption by people with normal immune and liver conditions. A method of purging, cleansing, and flavoring shellfish (primarily, oysters on half-shell) makes them more attractive for raw consumption year round; the processes 'winterize' the oysters, to coin a term. The oyster industry has suffered from bacterial contamination for centuries; however, now more than ever the government and public at large are demanding much more control over bacteria, salinity, and cleanliness of the half-shell stock. The enhancement process addresses all three qualities and seeks to obtain a limited guarantee. The oyster and water qualities are enhanced by significantly increasing the dissolved oxygen content of the artificial salt-water injection process which begins with freshly harvested oysters from certified open areas.

14 Claims, 2 Drawing Sheets

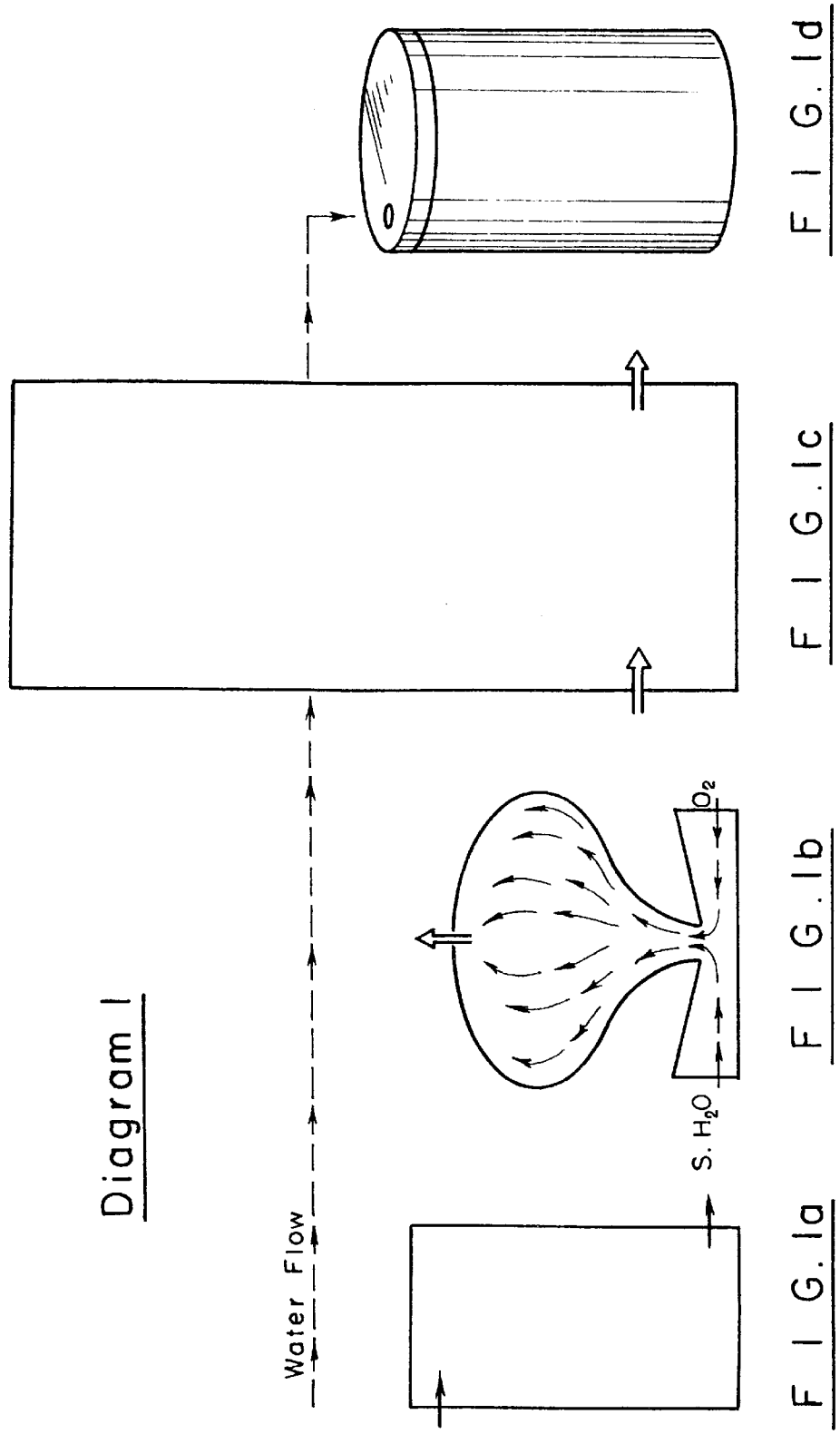

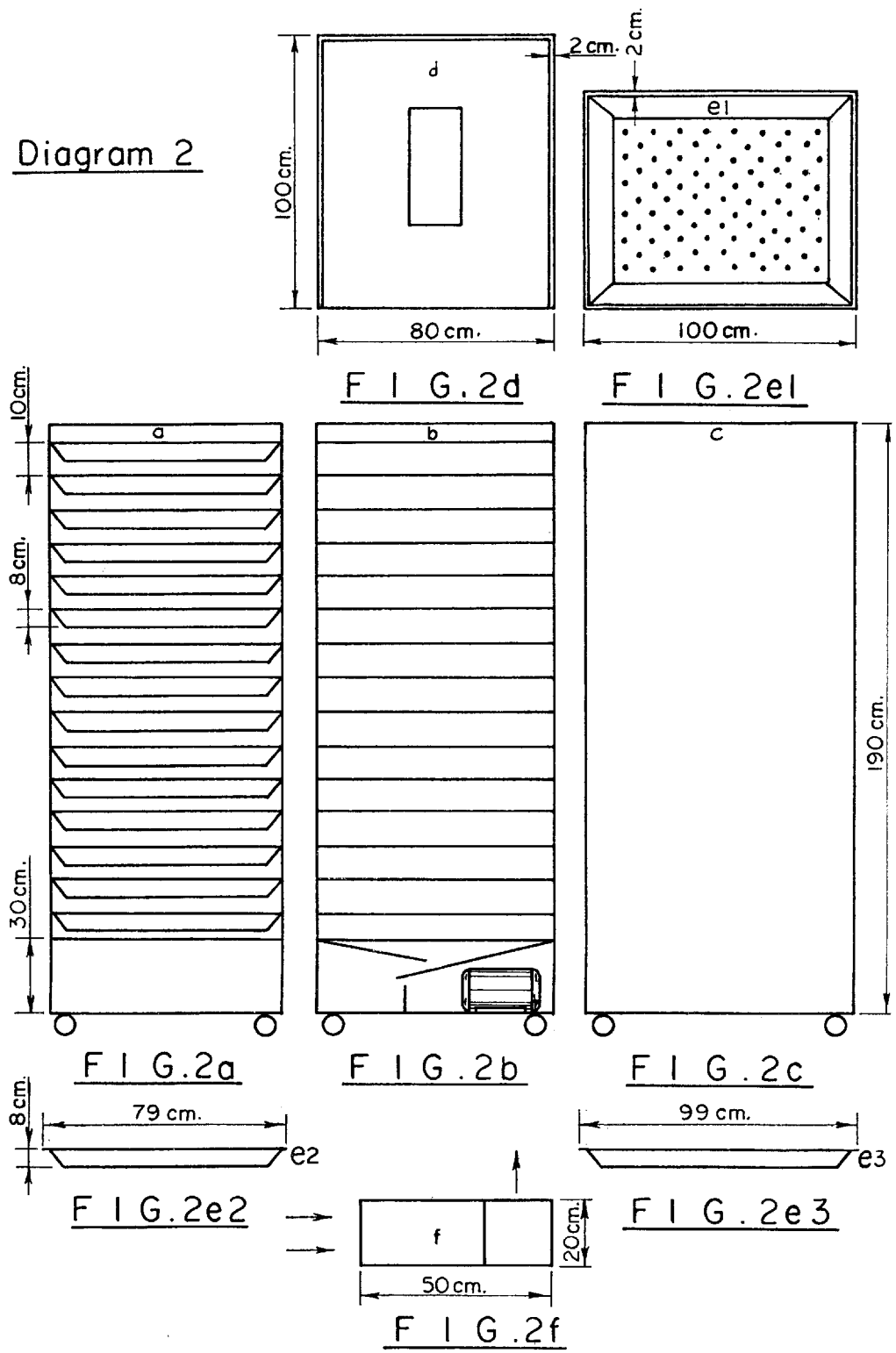

METHOD OF ENHANCING THE FLAVOR OF SEAFOOD

CROSS-REFERENCE TO RELATED APPLICATIONS

This application claims the benefit of U.S. Provisional Application No. 60/138,334; filed Jun. 9, 1999.

BACKGROUND OF THE INVENTION

1. Field of the Invention

The present invention relates to cleaning and packing seafood in a solution of filtered water with a specific salinity (20–30 ppt). The enhanced mineral and dissolved oxygen properties are utilized to purge shellfish (oysters) and other seafood product via saltwater injection with enhanced mineral salts and dissolved oxygen contents. The increased dissolved oxygen and mineral content maintains freshness and 'enhances' flavor in seafood products by significantly reducing spoilage and replenishing natural elements to the produce.

More particularly, the present invention relates to the utilization of refrigeration, natural ingredients, and simple drinking water filtration to clean and purge seafood, primarily oysters; thereby achieving control of the final taste, shell condition, and safety of oysters on the half-shell as well as fresh and frozen shrimp, lobster, fish fillets, and macroalgae (kelp).

2. General Background of the Invention

Currently, seafood products are harvested and sold as soon as possible in order to maintain freshness because of the inevitable presence of fouling agents in the natural harvesting procedures. Likewise, the produce freshness and taste qualities are adversely affected by processing and freezing processes. Frozen seafood is usually packed in fresh water; this bleeds out minerals from the meat which then becomes bland in taste.

As the environment gradually becomes more polluted and affected by man's intervention, microbial contamination of oyster beds is an ever-increasing problem. The condition of the harvest waters of shellfish has been a major concern for two millennium. This century the United States government has held conferences, formed committees, established administrations and passed laws concerning the commercial shellfish environment. People are still becoming ill by eating raw oysters from certified areas; however, most are from a high risk group. Although efforts have been made and much has been done, another process is needed for taste control and to eliminate the major threats associated with oysters such as the bacterial pathogens *Vibrio vulnificus* and *E. coli*. Thorough cooking kills both groups of bacteria as well as other processes of drastic measures; however, most if not all of these processes kill the oyster as well.

The taste and condition of the oysters, whether raw or cooked, depends primarily upon the conditions of the harvest waters and firmness of the water bottom. Since the temperature, salinity and food source of the water on oyster reefs are ever-changing, the taste of the oyster is too. The main question that a potential customer asks about oysters is, "are they salty?" and only half the time does the question of safety ever come up. Therefore, if an oyster comes from a certified area, then taste is the primary factor affecting marketability.

The following U.S. Patents are incorporated herein by reference:

| | | |
|---|---|---|
| 5,866,150 | February 1999 | Wang. |
| 5,679,392 | October 1997 | Schegan |
| 5,628,280 | May 1997 | Ericksson |
| 5,482,726 | January 1996 | Robinson |
| 5,249,548 | October 1993 | Dupuy |
| 5,262,186 | November 1993 | Bender |
| 5,186,121 | February 1993 | Smith, Jr. |
| 4,653,429 | May 1987 | Murphy |
| 4,537,149 | August 1985 | Ryan. |

U.S. Pat. No. 5,866,150 is a system which produces an algae (Cheatocerous sp.) that has antimicrobial properties and may be active against Vibrio sp. of bacteria. This system was designed to help the processes which clean shellfish and may be helpful to the present application. However, the algae is not needed to obtain the flavor qualities sought which is the main goal of the systems of the present invention.

U.S. Pat. No. 5,679,392 is a system which utilizes heat treatment and cold water baths to attack bacteria. The present inventor does not seek to utilize this process because it adversely affects the flavor of raw shellfish. However, the present application seeks protection from the 'pasteurization' process by protecting the right to use the specific saline solutions stated in the application.

U.S. Pat. No. 5,628,280 is a system which utilizes floating stacked trays in open waters for shellfish purging and growing purposes. The present invention is completely different from the cleansing/purification arrays of this patent because the application is on land and the water is made from drinking water.

U.S. Pat. No. 5,482,726 is a system which uses pressurization and irradiation during depuration processes to purge shellfish. The present inventor does not seek to utilize any of these processes.

U.S. Pat. No. 5,262,186 is a system which utilizes alkali metal orthophosphate to control bacteria in shellfish. The present inventor does not seek to use this process.

U.S. Pat. No. 5,249,548 is a system which depurates polluted oysters in tanks in an open vessel designed to generate upwelling currents of seawater. The system seeks to clean contaminated shellfish with natural water. The present inventor does not seek to use seawater or polluted oysters.

U.S. Pat. No. 5,186,121 is a system which depurates bivalves in a series of underground tanks with seawater. The system seeks to clean contaminated shellfish with natural water. The present inventor does not seek to use seawater or polluted oysters.

U.S. Pat. No. 4,653,429 is a process and apparatus for preparation of bi-valves for human consumption with water from an aquifer. Tainted oysters are to be placed in a bath of natural seawater with a salinity of 4–10 ppt at the temperature of 46–54 degrees F. and a dissolved oxygen level of 4–10 mg/l. The present invention differs from this previous method in that the present invention preferably utilizes oysters from certified open areas and water made from local drinking water and food grade salt. The temperature in the present invention is kept below 45 degrees F. as stated by state law and the dissolved oxygen levels are enhanced to over 10 mg/l with the addition of minerals and an oxygen supersaturation chamber.

U.S. Pat. No. 4,537,149 is a method and apparatus for cleaning tainted shellfish in a depuration tank with U-V radiation filter in a salt-water bath which is kept at the temperature of 40–70 degrees F., the salinity of 18–31 ppt, and dissolved oxygen levels of 5–10 mg/l. The present invention differs from this previous method in that the present invention utilizes oysters from certified open areas and water made from local drinking water and food grade salt. The temperature in the present invention is kept between 36–45 degrees F. and the dissolved oxygen levels are enhanced to over 10 mg/l. The salinities are similar but differ in that the present invention utilizes the salinities of 32–40 ppt to enhance and stabilize the flavor and possibly reduce the bacterial content of oysters.

BRIEF SUMMARY OF THE INVENTION

The apparatus of the present invention solves the problems confronted in the art in a simple and straightforward manner. What is provided is a method which not only enhances the flavor and natural qualities of oysters but also of other seafood products such as: all species of shrimp, lobsters, crawfish, and fresh and salt-water fish. Producing enhanced water is the key to the seafood preparing and packing processes of the present invention. Naturally harvested seafood produce is cleaned and packed in the water to maintain freshness; specifically, to obtain clean, excellent tasting, live oysters.

1. The Limited Guarantee states:

The treated seafood should be clean and have a lightly salted flavor;

Furthermore, shucked and purged oysters should have a delicate, salty taste and be pristinely clean, free of mud and grit. They should always be harvested from certified open leases and safe for raw consumption by individuals with normal, healthy liver and immune systems.

2. By injecting saltwater which has enhanced levels of dissolved oxygen, the purging processes allow the oysters to naturally expel debris and achieve optimum salinity for best taste.

3. The supersaturated state of dissolved oxygen content in water is hard to achieve and very unstable; therefore, the addition of natural minerals or mineral water as well as lowering the temperature below 12 degrees C. helps to stabilize the elevated dissolved oxygen. The enhanced oxygen and mineral content in the purging water strengthens and increases the mineral absorption in the epithelial tissues of the stomach and intestines in the oysters.

3. By maintaining the water temperature below 12 degrees C., the oyster can be 'winterized' or made to feel that it is winter and discontinue reproductive processes. This fattens the oysters and helps to remove chalkiness from the flavor of half-shell oysters; consequently, one goal of the present invention is to produce a "winter oyster" in the summertime.

4. The fresh supply of oxygenated saltwater and winter-like environmental conditions attack and severely weaken the bacteria *Vibrio vulnificus*; thus, the bacterial population is significantly reduced or removed completely.

5. The present invention does not seek the classification of depuration because it suggests that contaminated oysters are depurated for resale. The proposed processes start with safe oysters from open leases and seek to enhance their conditions for control on the retail end of the sales with a live oyster on the half-shell as close to perfect as possible every time.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

Diagram 1 is a flow schematic describing the direction water travels through the series of apparatus in the process for shellfish holding (storage) and enhancement.

FIG. 1a shows the initial water treatment device that prepares municipal drinking water for the addition of natural seasalts (food grade) and oxygen.

FIG. 1b shows the 'dissolved oxygen enhancement chamber' which injects oxygen into a saline stream that expands quickly in the chamber just before it is condensed, captured, and sent to the purging apparatus. This component (oxygen cones) is purchased from Aquatic Eco-systems, Inc. and is made by Sweetwater, Inc. (also called oxygen saturators).

FIG. 1c represents the purging portion of the process which is shown in greater detail in Diagram 2.

FIG. 1d shows a water reclamation receptacle which captures the 'used water' from the system and is utilized in other avenues of research that requires clean, cultured, salt water.

Diagram 2 shows perspective views of the preferred embodiment of the apparatus of the present invention for holding or storing molluscan half-shell stock; however, certain modifications may be necessary to increase the efficiency of water flow and/or material conservation.

FIG. 2a is a frontal view of the preferred embodiment of the apparatus of the present invention. The rack is fully stocked with 15 trays which are shown in FIGS. 2e1, 2e2; and 2e3.

FIG. 2b is a frontal view of the preferred embodiment of the apparatus of the present invention without the trays; the removable sump tray's front is not represented in order to illustrate the pump/filter (see FIG. 2f) placement.

FIG. 2c is an either side view looking through the side panel of the preferred embodiment of the apparatus of the present invention;

FIG. 2d is a top view of the of the apparatus of the present invention;

FIG. 2e1 is a top view of the preferred embodiment of a tray which holds shellfish in the shells and allows them to purge any unwanted material from inside their shells. (FIGS. 2e2 and 2e3 are the front/rear and right/left side views respectively.)

DETAILED DESCRIPTION OF THE INVENTION

The seafood packing process entails following HAACP, DHH, and EPA guidelines for food handling and preparing for packing with the addition of the Enhanced Saline Solution as the packing water.

The wet-storage of shellfish is a legal and certifiable process by which shell stock may be held in water until resale. The following processes utilize the most modem filtration principles in order to obtain a source of pristine artificial water made by filtering municipal drinking and adding all-natural minerals or mineral water and salt to achieve salinities ranging from 18 ppt to 40 ppt. The dissolved oxygen content (4–8 mg/l normal) of the purging water is enhanced to over 10 mg/l via reduced temperature and oxygenation chambers which allow the air and water volume to expand achieving supersaturated DO levels.

Special Preparatory Procedures

Filtration

Initial filtration of municipal drinking water removes residual chlorine and most minerals. Washing, purging, and wet storing oysters requires a filtration scheme which removes particulate matter, dissolved organics, and other microbial material. The following are types of filtration that are preferred:

RO—reverse osmosis produces water more pure than natural springs;

mF—micron filtration removes particulate matter and debris;

ACF—Activated carbon filtration removes chlorine, ammonia, and ozone;

O3—ozone injection cleans and sterilizes water; *1

UV—ultra-violet light chambers kill bacteria and residual ozone; *2

PS—protein skimmers remove dissolved solids and organics.

Making Water

Making water preferably requires municipal drinking water to be RO filtered, then to be placed into a clean tank and ACF recirculated. The optimal salinity is 25 ppt; although, higher salinities between 32–36 ppt may achieve better results in controlling the final taste of the oyster as well as controlling bacteria. The lower salinity of 10 ppt is also useful in removing *Vibrio vulnificus* and helps the oyster in the transition from the no salinity to the higher 25 ppt.

The addition of natural minerals or mineral water helps the oyster and facilitates the enhancement of DO supersaturation. This is achieved by passing chilled 'enhanced' salt-water through a specially designed chamber which helps DO to become supersaturated. The water from this chamber is now ready for the purging processes.

Recirculation

Several water containers are required to make water, wash and wet-store oysters. Filtration is not required on all containers; however, pumping to and from the tanks is required. Making water in a tank requires a pump with venturi valve and ACF. Wet-storage requires water to recirculate through mF, ACF, and PS. Only used water tanks are O3 injected and UV sterilized.

Oyster pre-washing

Oysters are prepared to be shucked or wet stored by pre-washing and placing 144 oysters into trays that are then washed either manually or in a machine which blasts away any external mud and broken shell material. The trays can then be placed in the cooler at 5 C, or into a prepared wet storage tank, or shucked into gallons.

Seafood packing and Enhancement SOP

Seafood products are to be washed (rinsed) with municipal drinking water and then packed with 20 ppt enhanced water.

Oyster Handling Standard of Operations (SOP)

All water used for enhancing oysters (purging or shucking) shall be newly made.

Shucking SOP

Prepare for shucking by making and chilling water to 5 C in the washing chamber and begin recirculation with ACF and mF. If the oysters are to be packed into containers for selling, then fresh water should be used in the washing chamber. Shucking begins as each prewashed tray of oysters is shucked into the washer which rolls them in curtains of air bubbles, scrubbing off grit and mud from the oyster tissue. Once a tray is finished, the shucker should rinse the oysters on a specially designed stainless steel tray and then pour them into a container. The container should then be weighed and topped off with 15%–20% of the weight with 25 ppt salt water. After placing the container in the cooler and briefly hosing down the shucking area, another tray should be obtained and shucking begins again.

Rinsing the oyster may be done with fresh or salt water. Washing the shucked oysters with fresh tap water right after they are shucked is more efficient at removing Vibrio v. than washing them with salt water; however, the taste is slightly washed out. If the oysters are to be served immediately on the half shell, then the rinsing water should be 35 ppt, because people like saltier oysters and the higher salinity may also help to kill bacteria. The half-shell oysters may be rinsed immediately on the shell or in a washing chamber with 25–35 ppt water (depending on desired taste) and then placed on the half-shell for serving. Since summer oysters typically have a more chalky taste, they may be rinsed in chilled 25 ppt water for 20 minutes after the shucking process and then sold.

Shucked oysters exhibit excellent qualities of taste, texture, and cleanliness directly after washing and remain good for another week at which time they should be frozen or cooked to maintain premium quality. Oysters should always be chilled immediately upon receiving.

Wet-storage (w-s SOP)—w-s is a legally certifiable storage practice using water in tanks to hold oysters and keep them alive.

**Preparation for w-s includes filling the w-s tank to 50% capacity with fresh water which is chilled to the temperature of the oysters going into the tank. Initiate mF, ACF, and recirculate.

W-s begins when the tank is actually loaded. It is IMPERATIVE that the tank is chilled to and stay below 12 C throughout w-s. The salinity of the w-s water is slowly increased to 32 ppt, the target salinity, as the tank is slowly topped off with 40 ppt water. Although wet-storage works at room temperature it is best to chill the oysters down to 8 C in the cooler and then place them into a previously chilled w-s tank at 10 C for recirculation. The length of w-s varies with the date and location of harvest; therefore, w-s can vary from 12–24 hours in the winter to 7–14 days in the summer. At the end of w-s, the water in the w-s tank is pumped into used water tanks to be utilized in other areas of research.

Oysters can be w-s if they are freshly harvested or with oysters which are 10–12 days old but still alive. The taste of w-s oysters gets better 24–48 hours after harvest from the tank and remains good for another week at which time they should be either shucked or w-s again. It is preferred to shuck a previously w-s oyster rather than to w-s it again, although the oyster is made as fresh again through w-s.

BRIEF EXPLANATION OF THE INVENTION

Oysters, harvested from certified open areas, are 'enhanced' with an all-natural process which produces an excellent tasting live oyster year round.

Refrigeration is an essential element throughout all of the processes for purging or wet-storing of all shellfish.

It is relatively simple to enhance the flavor of shellfish; if you give it good water, it purges itself.

There are two different techniques which result in a limited guarantee of excellent tasting, clean oysters either in gallons or in the shell.

The processes are possible with all commercial shellfish species of bi-valves and crustaceans; however, the oyster of preference is *Crassosstrea virginica*.

The oyster industry has suffered from bacterial contamination for centuries; however, now more than ever the government and public at large are demanding much more control over bacteria, salinity, and cleanliness of the half-shell stock. The enhancement process addresses all three qualities and seeks to obtain the following guarantee:

Shucked and purged oysters should have a delicate, salty taste and be pristinely clean, free of mud and grit. They should always be harvested from certified open leases and safe for raw consumption by individuals with normal, healthy liver and immune systems.

The oyster and water qualities are enhanced* by significantly increasing the dissolved oxygen content of the artificial salt-water injection process** which begins with freshly harvested oysters from certified open areas and continues as follows:

Step 1: oyster pre-washing- the sacks of oysters are emptied onto washing tables and are then rinsed with fresh water to remove external mud and detritus. All clusters and un-uniform oysters are removed for immediate shucking leaving only the single half-shell stock to be placed onto trays (144/tray).

Step 2a: wet-storage- a legally certifiable process which allows the oyster to purge the natural water from its system with new water.

*The oysters are 'enhanced' by being purged with oxygenated, mineralized, salt water which strengthens the epithelial tissues and increases mineral absorption in the oysters' internal organs. Increasing the dissolved oxygen content of water is not easy because oxygen saturation in water is unstable; therefore, the process must help the dissolved oxygen to become supersaturated. Specially designed chambers help to increase DO levels; furthermore, utilizing mineral water to make salt water also helps to raise DO levels. Even though the purging process works without the enhancement portion (mineralization and oxygenation) if the refrigeration practices are followed, the added benefits of the process are worth the extra steps.

**The wet-storage and purging processes work without 'enhancing' the dissolved oxygen of the water which is used; however, ACF and refrigeration are essential elements of the processes to control bacteria and the artificial salt-water injection is essential for the taste guarantee portion of the process. The most significant part of the purging process is the injection of saline solutions (from 15 ppt to 40 ppt) into the oysters, whether shucked or wet-stored; therefore, it is the element which first needs to be patented.

1. The pre-washed trays of 144 oysters are placed in slots on movable racks which contain reservoirs of 'enhanced' water and pumps with filters. Each rack is a column of 15–20 levels of trays and the water is pumped from the bottom of the column to the top tray. (Note: the water can be pumped across each tray for greater circulation at each level.) The trays are perforated to allow the water to fall through each level. Upon initializing wet-storage, the water in each rack should be the same temperature as the oysters placed in them.

2. One hour after wet-storage has begun, 40 ppt salinity water can be added to the reservoir to begin to increase to system's salinity to 25–35 ppt depending on desired taste. The length of time for wet-storage ranges from 24 hours to 7–14 days depending on the initial quality of the oyster and desired effect.

3. Finalizing wet-storage requires the trays to be removed from the racks and emptied into boxes (1 tray/box) which are then properly labeled for shipping as half-shell stock. The water from each rack is transferred to a used water tank to be filtered and used on collateral projects. The water is not to be re-used for oyster purging purposes.

Step 2b: oyster shucking- the less than perfect looking oysters are to be shucked and purged utilizing the enhancement process for shucking.

The oysters are to be shucked into a washing chamber which scrubs the oyster tissue clean with many air bubbles in fresh ice water. Once shucking is completed, the oysters are rinsed again on a skimmer table and then placed into a gallon container which is topped off with freshly made 'enhanced' 25 ppt artificial salt water. The gallons are then rinsed externally before shipping.

PARTS LIST

The following is a list of parts and materials suitable for use in the present invention:

1–20 Racks of the preferred embodiment of the present invention

1–20 Submersible water pumps (such as model no. 2500hp produced by Rio Pumps)

15–300 Trays (made of DHH grade material such as stainless steel or plastic)

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims: although initial bacterial tests indicated a tremendous reduction of Vibrio sp., further tests must be performed and replicated to support any bacterial reduction or elimination claims will be made. At this time it is enough that the process meets FDA and DHH requirements and it greatly affects the raw half-shell flavor in a positive manner.

As used herein, ppt means parts per thousand.

What is claimed is:

1. A method of enhancing the flavor of oysters, comprising:

providing freshly harvested oysters from predetermined open areas;

placing the oysters on washing tables and rinsing the oysters with fresh water to remove external mud and detritus;

removing all clusters and un-uniform oysters for immediate shucking leaving only the single half-shell stock;

placing the single half-shell stock onto perforated trays, each tray being placed in slots on movable racks which contain reservoirs of enhanced water and pumps with filters, wherein each rack is a column of 15–20 levels of trays;

pumping the water from the bottom of the column to the top tray, the water falling through each level, and upon initializing wet-storage, the water in each rack is approximately the same temperature as the oysters placed in the rack; and approximately one hour after wet-storage has begun, adding high salinity water to the reservoir to begin to increase salinity of the water to 25–35 ppt, wherein the temperature of the oysters is maintained at or below 12 degrees C.

2. The method of claim 1, wherein the water is enhanced by being oxygenated, mineralized, and salinated.

3. The method of claim 1, wherein the water is pumped across each tray for greater circulation at each level.

4. The method of claim 1, wherein the enhanced water is made by:

providing municipal drinking water;

RO filtering the water;

placing the RO filtered water in a clean tank;

ACF recirculating the water; and adding salt to the water to achieve a salinity of 10 ppt–36 ppt.

5. The method of claim 2, wherein the enhanced water is made by:

providing municipal drinking water;

RO filtering the water;

placing the RO filtered water in a clean tank;

ACF recirculating the water; and adding salt to the water to achieve a salinity of 10 ppt–36 ppt.

6. The method of claim 3, wherein the enhanced water is made by:

providing municipal drinking water;

RO filtering the water;

placing the RO filtered water in a clean tank;

ACF recirculating the water; and adding salt to the water to achieve a salinity of 10 ppt–36 ppt.

7. A method of enhancing the flavor of seafood, comprising:

(a) providing freshly harvested seafood from predetermined open areas;

(b) placing the seafood on washing tables and rinsing the seafood with fresh water to remove external mud and detritus;

(c) placing the seafood onto perforated trays, each tray being placed in slots on movable racks which contain reservoirs of enhanced water and pumps with filters, wherein each rack is a column of trays;

(d) pumping the water from the bottom of the column to the top tray, the water falling through each level, and upon initializing wet-storage, the water in each rack is approximately the same temperature as the seafood placed in the rack; and (e) adding high salinity water to the reservoir to begin to increase salinity of the water to 25–35 ppt, wherein the temperature of the seafood is maintained at or below 12 degrees C.

8. The method of claim 7, wherein the water is enhanced by being oxygenated, mineralized, and salinated.

9. The method of claim 7, wherein the water is pumped across each tray for greater circulation at each level.

10. The method of claim 7, wherein the enhanced water is made by:

providing municipal driking water;

RO filtering the water;

placing the RO filtered water in a clean tank;

ACF recirculating the water; and adding salt to the water to achieve salinity of 10 ppt–36 ppt.

11. The method of claim 8, wherein the enhanced water is made by:

providing municipal drinking water;

RO filtering the water;

placing the RO filtered water in a clean tank;

ACF recirculating the water; and adding salt to the water to achieve a salinity of 10 ppt–36 ppt.

12. The method of claim 9, wherein the enhanced water is made by:

providing municipal drinking water;

RO filtering the water;

placing the RO filtered water in a clean tank;

ACF recirculating the water; and adding salt to the water to achieve a salinity of 10 ppt–36 ppt.

13. The method of claim 7, wherein the seafood comprises oysters.

14. The method of claim 13, further comprising the step of removing all clusters and un-uniform oysters for immediate shucking leaving only the single half-shell stock.

* * * * *